US009016118B2

(12) United States Patent
Townsend et al.

(10) Patent No.: US 9,016,118 B2
(45) Date of Patent: Apr. 28, 2015

(54) MOUNTING STRUCTURE

(75) Inventors: Gene A. Townsend, Dunlap, IL (US); Dan J. Becker, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 414 days.

(21) Appl. No.: 13/332,647

(22) Filed: Dec. 21, 2011

(65) Prior Publication Data

US 2012/0160409 A1 Jun. 28, 2012

Related U.S. Application Data

(60) Provisional application No. 61/426,191, filed on Dec. 22, 2010.

(51) Int. Cl.
*B60C 23/04* (2006.01)

(52) U.S. Cl.
CPC .................................. *B60C 23/0493* (2013.01)

(58) Field of Classification Search
CPC .. G01L 17/00; B60C 23/0447; B60C 23/0493
See application file for complete search history.

(56) References Cited

U.S. PATENT DOCUMENTS

| | | | |
|---|---|---|---|
| 5,573,611 | A | 11/1996 | Koch et al. |
| 6,217,683 | B1 | 4/2001 | Balzer et al. |
| 6,312,539 | B1 | 11/2001 | Bohm et al. |
| 6,444,069 | B1 | 9/2002 | Koch et al. |
| 6,474,380 | B1 | 11/2002 | Rensel et al. |
| 6,546,982 | B1 * | 4/2003 | Brown et al. .............. 152/152.1 |
| 6,922,141 | B2 | 7/2005 | Saheki et al. |
| 6,931,920 | B2 | 8/2005 | Modawell et al. |
| 7,275,427 | B1 | 10/2007 | Martin |
| 7,331,367 | B2 | 2/2008 | Koch et al. |
| 7,347,088 | B2 | 3/2008 | Shimura |
| 7,430,906 | B2 | 10/2008 | Nakao et al. |
| 2005/0000278 | A1 | 1/2005 | Haralampu et al. |
| 2006/0158340 | A1 | 7/2006 | Wilson et al. |
| 2006/0220816 | A1 | 10/2006 | Scheungraber et al. |
| 2007/0251620 | A1 | 11/2007 | Perrier et al. |
| 2008/0018445 | A1 | 1/2008 | Shimura |
| 2009/0159169 | A1 | 6/2009 | Durif et al. |
| 2009/0218459 | A1 | 9/2009 | Durif et al. |
| 2009/0266153 | A1 | 10/2009 | Hironaka |
| 2010/0007477 | A1 | 1/2010 | Wilson et al. |
| 2011/0025487 | A1 * | 2/2011 | Laird et al. .................... 340/447 |

FOREIGN PATENT DOCUMENTS

| | | |
|---|---|---|
| DE | 102006004707 | 9/2006 |
| DE | 102006027918 | 12/2007 |
| DE | 102007001279 | 7/2008 |
| DE | 102007008043 | 8/2008 |
| WO | 2009070065 | 6/2009 |

* cited by examiner

*Primary Examiner* — Paul West
(74) *Attorney, Agent, or Firm* — Finnegan, Henderson, Farabow, Garrett & Dunner, LLP

(57) ABSTRACT

A mounting structure for an electrical device includes a mounting portion and a containing portion. The mounting portion has a mounting surface and an outer surface. The containing portion has an inner surface with protrusions forming an indent, an outer surface, an insertion aperture, and a flow aperture.

16 Claims, 10 Drawing Sheets

MOUNTING STRUCTURE

RELATED APPLICATION

This application is based upon and claims the benefit of priority from U.S. Provisional Application No. 61/426,191 by Gene A. Townsend et al., filed Dec. 22, 2010, the contents of which are expressly incorporated herein by reference.

TECHNICAL FIELD

The present disclosure relates generally to a mounting structure for mounting and retaining an electronic device. Specifically, the present invention relates to a mounting structure for mounting and retaining an electronic device inside a tire.

BACKGROUND

Knowing the temperature and pressure inside a tire on a machine may help the owner or operator of the machine in increasing the life of the vehicle's tires, and thus the productivity of the machine. It may be difficult to change or inflate a tire on a work machine at a worksite. For example, appropriate tools may not be available and environmental factors may complicate the task. If it is known that a tire's pressure is decreasing, the tire can be fixed or replaced in a service bay at a convenient time, and the machine's availability for work may be increased.

When a work machine is operated with one or more tires at less or more than optimum pressures, the operator may experience difficulty in operation of the machine. Knowledge of tire pressure can prevent loss of tire life and/or reduce maintenance and service costs.

It may be desirable to mount a temperature and/or pressure sensor in the interior of a tire such that the pressure may be measured by the sensor and adjusted for temperature.

Sensor communication wires may be difficult to route in. Wireless communicating temperature and pressure sensors, such as RF sensors, are now available. Desirable mounting of these sensors in tires may include ease of serviceability and reliability of the mount.

The interior of a tire may have liquids splashing around as the machine is operated. These liquids may be helpful to increase the tire life by reducing rust and sealing small cracks and punctures. These liquids may, for example, include Tire Life® a liquid formula used to protects tires and decrease wheel/rim loss from scale and pitting, while improving air retention through its sealing qualities. While these liquids may increase tire life they may be harmful to an electrical device such as a sensor if the mounting structure is not protective.

When a tire rotates and moves a machine, it's shape may change partially due to the weight of the machine and the surface the machine is traveling over. If a mounting structure on the inside of the tire is not flexible such that it flexes with the tire, it may break or come loose from the tire.

When replacing a tire on a machine, the easier it is to install a new mounting structure in a new tire and insert a new sensor, the less time will need to be spent on maintenance. A simpler process aids in reducing the time a service technician will need to complete the tire replacement.

SUMMARY OF THE INVENTION

In one aspect a mounting structure for an electrical device is disclosed. The mounting structure includes a mounting portion and a containing portion. The mounting portion has a mounting surface and an outer surface. The containing portion has an inner surface with protrusions forming an indent, an outer surface, an insertion aperture, and a flow aperture.

In another aspect a mounting assembly for the inside of a tire is disclosed. The mounting assembly includes a patch, a mounting structure, and an electrical device. The patch includes an adhesive surface, and an outer surface having a mounting area and a containing area. The mounting structure includes a mounting portion and a containing portion. The mounting portion has a mounting surface fixedly attached to the patch mounting area, and an outer surface. The containing portion has an inner surface with protrusions forming an indent, an outer surface, an insertion aperture, and a flow aperture. The electrical device is at least partially enclosed by the containing portion and containing area. The electrical device has a protection protrusion sitting in the indent.

In another aspect, a method of mounting an electrical device to the inside of a tire is disclosed. The method includes fixedly attaching the mounting surface of a mounting structure to a mounting area of a patch outer surface to form a pocket from a containing area of the patch outer surface and an inner surface of a containing portion of the mounting structure. The method further includes fixedly attaching a patch adhesive surface to an inside surface of a tire. The method further includes inserting the electrical device into the pocket through an insertion aperture. The method further includes positioning the electrical device in the pocket such that a protection protrusion on the electrical device sits in an indent formed by protrusions on the inner surface of the containing portion, and the electrical device is in fluidic contact with the interior of the tire through the insertion aperture and a flow aperture.

DETAILED DESCRIPTION

Reference will now be made in detail to specific embodiments or features, examples of which are illustrated in the accompanying drawings. Generally, corresponding reference numbers will be used throughout the drawings to refer to the same or corresponding parts.

Referring now to FIGS. 1-4, an exemplary embodiment of a mounting assembly 100 for mounting an electrical device 106 to the inside of a tire is depicted in various views. The mounting assembly 100 includes a mounting structure 102, a patch 104, and an electrical device 106.

Figure 1:
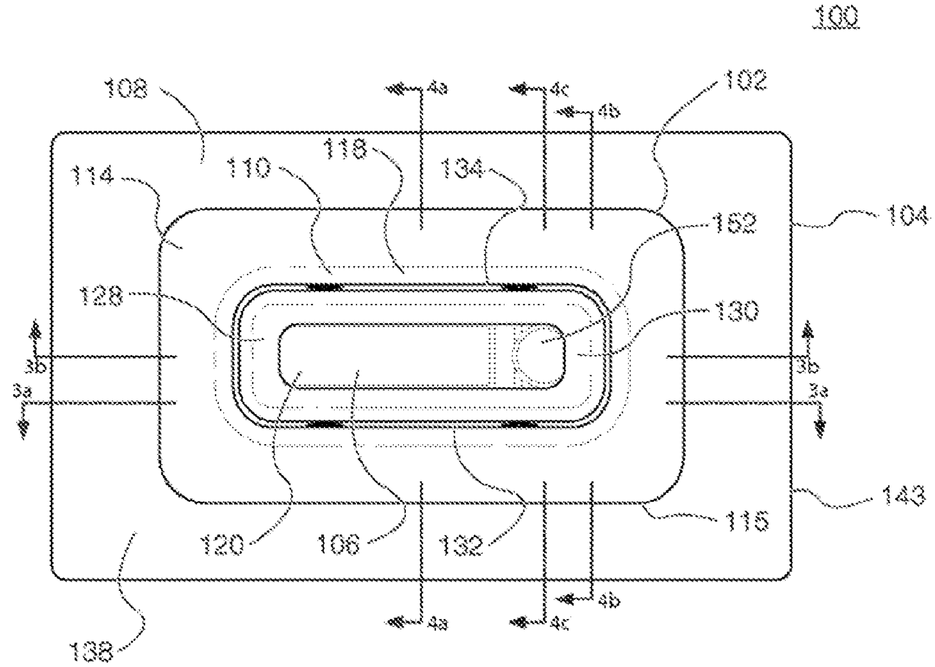
FIG. 1 depicts a top view of an exemplary embodiment of a mounting assembly.
Figure 2:
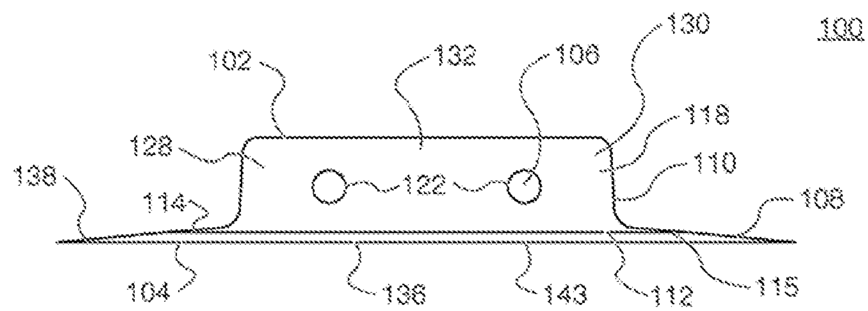
FIG. 2 depicts a side view of the exemplary embodiment of the mounting assembly in FIG. 1.
Figure 3A:
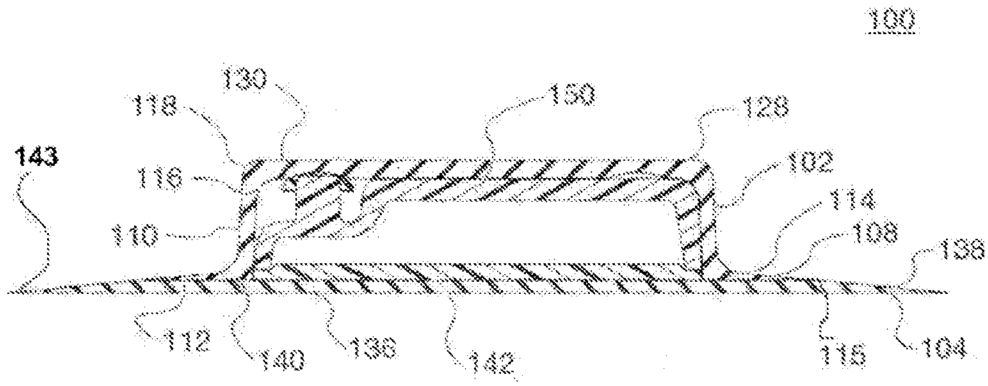
FIGS. 3A and 3B depict cross sectional views of the exemplary embodiment of the mounting assembly in FIG. 1.
Figure 3B:
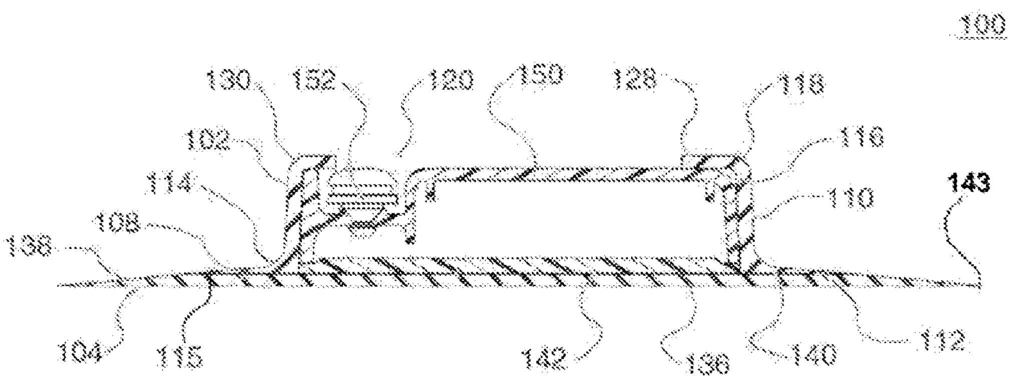
Figure 4A:
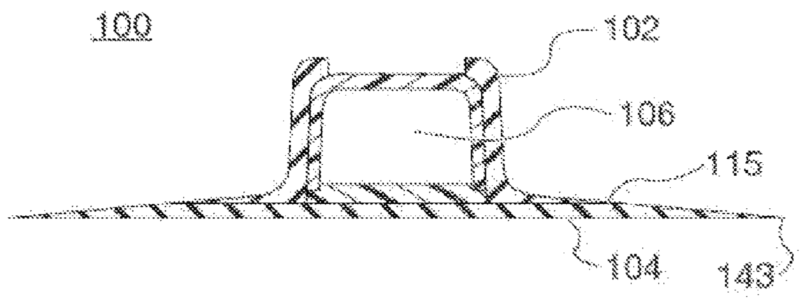
FIGS. 4A, 4B, and 4C depict cross sectional views of the exemplary embodiment of the mounting assembly in FIG. 1.
Figure 4B:
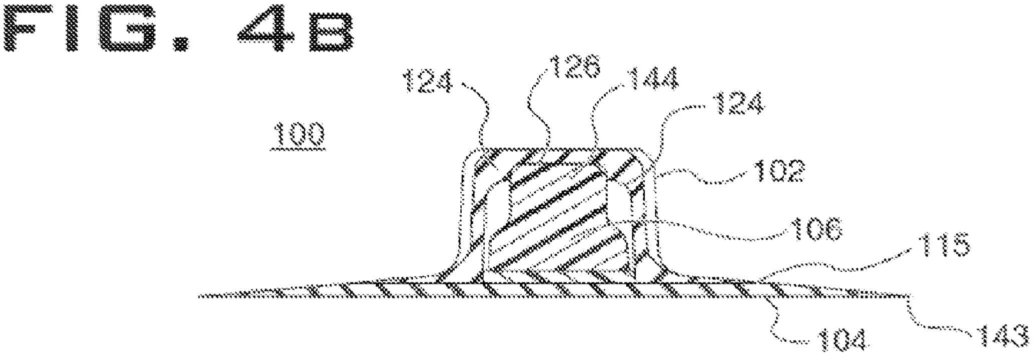
Figure 4C:
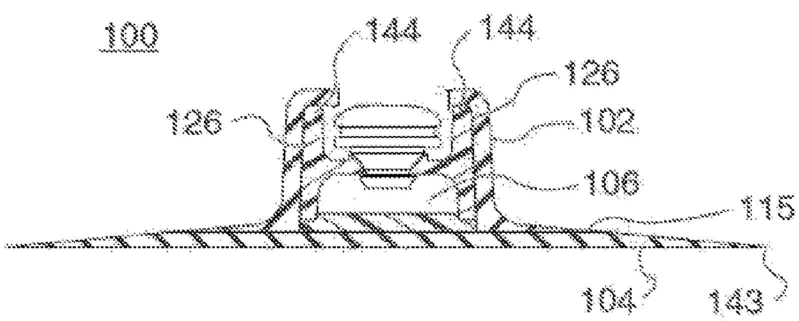
Figure 5:
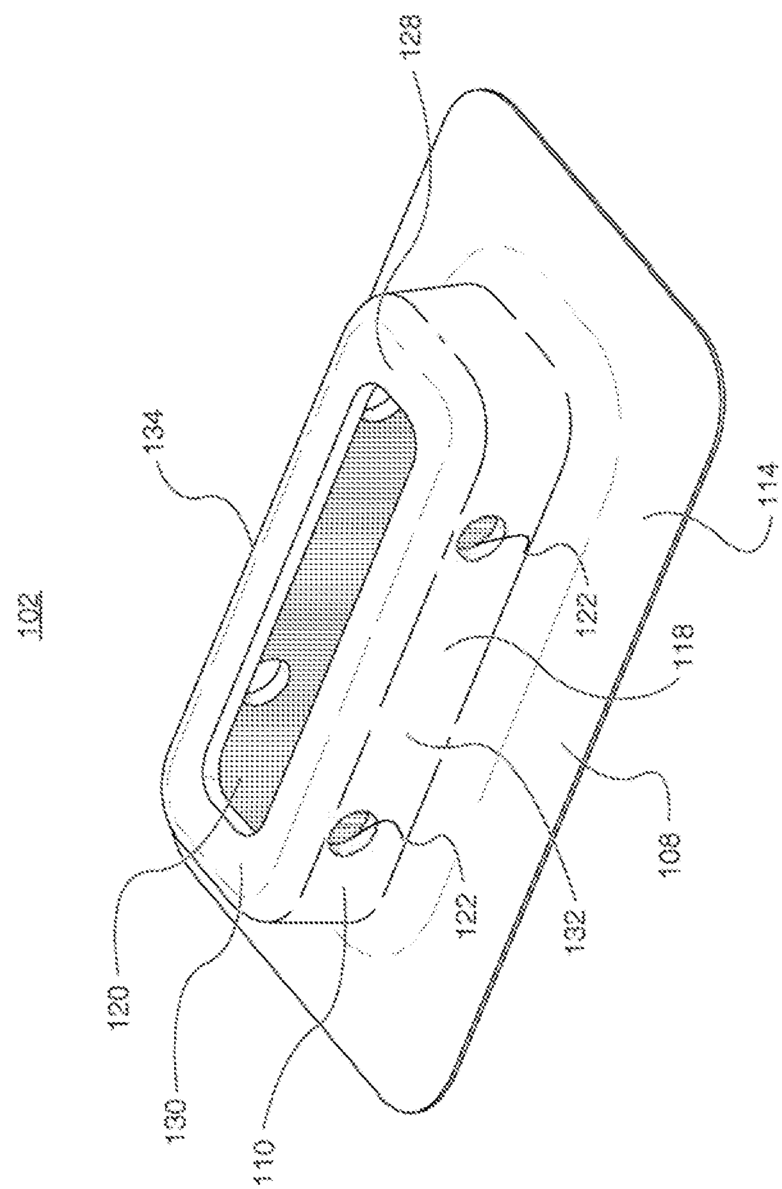
FIG. 5 depicts a perspective view of an exemplary embodiment of a mounting structure.
Figure 6:
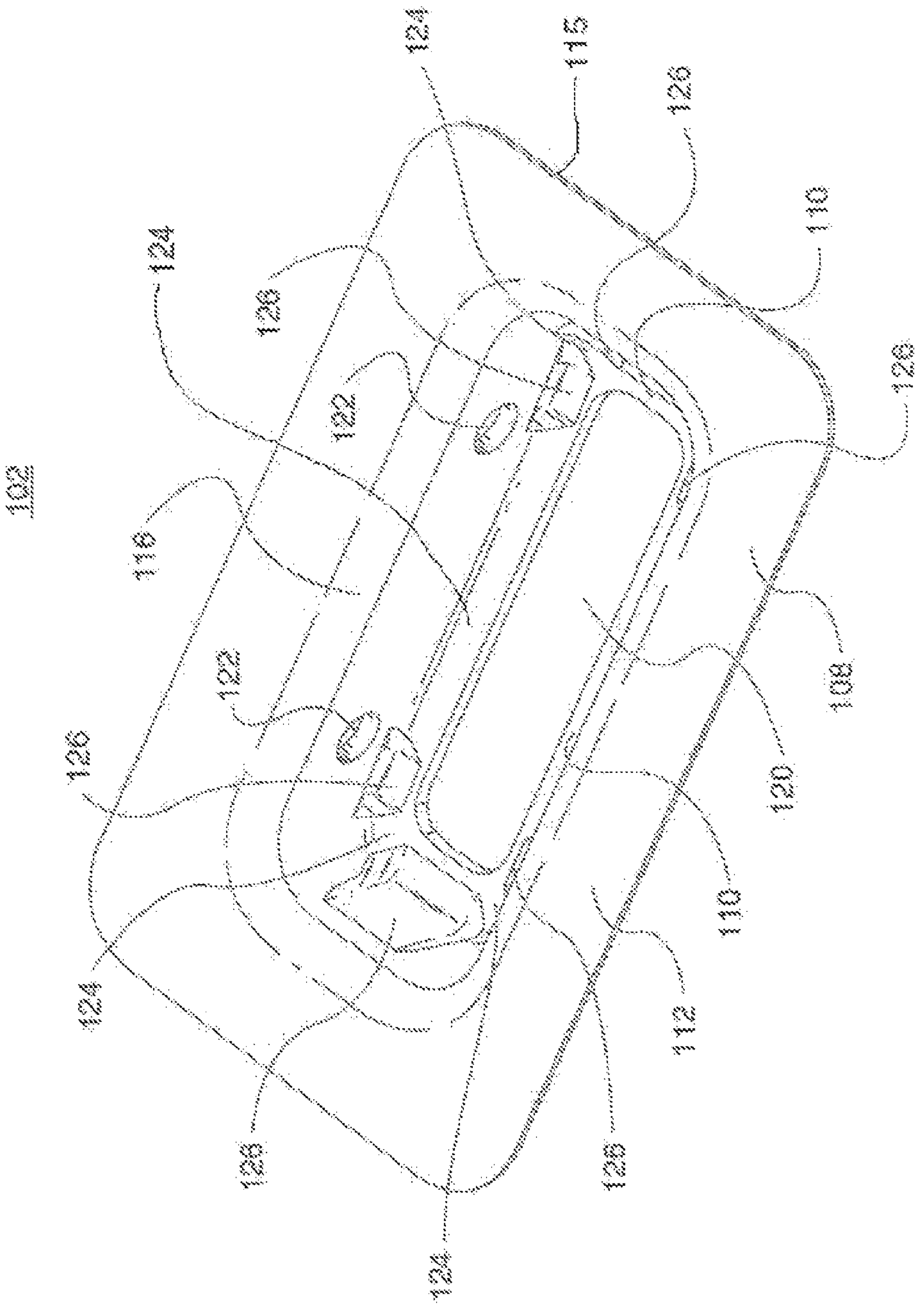
FIG. 6 depicts another perspective view of the exemplary embodiment of a mounting structure in FIG. 5.

Referring now to FIGS. 5 and 6, a first exemplary embodiment of the mounting structure 102 is depicted. The mounting structure 102 includes a mounting portion 108 and a containing portion 110.

In the depicted embodiment, the mounting portion 108 is substantially flat. However, the mounting portion 108 may be flexible such that after the mounting structure 102 is installed in a tire, the mounting portion 108 matches the shape of the sidewall of the tire. The mounting portion 108 includes a perimeter in the shape of a rectangle with rounded corners. The mounting portion 108 includes a rectangular aperture in the approximate center which is similarly shaped but dimensionally smaller than the perimeter. This rectangular aperture of the mounting portion 108 may match the shape of the perimeter of the containing portion 110. The mounting portion 108 may include an edge 115 on the perimeter which may be tapered.

The mounting portion 108 may be designed to attach the containing portion 110 to the patch 104 and/or the interior of a tire. In alternative embodiments the mounting portion 108 may include a different shaped perimeter and may have a different shape aperture designed to match the perimeter of the containing portion 110 as would be known by an ordinary person skilled in the art now or in the future.

The containing portion 110 may be fixedly attached to the mounting portion 108. The containing portion 110 may have a perimeter shaped substantially similar to the aperture in the mounting portion 108. The containing portion 110 and the mounting portion 108 may be molded together as one structure or they may be molded separately and then fixedly attached to each other by any means that is known by an ordinary person skilled in the art now or in the future. In alternative embodiments the mounting portion 108 and the containing portion 110 may be manufactured by other means than molding, for example, cutting from a sheet, forming through pressure, and/or attaching with rubber cements, glues, or a heating process. The mounting portion 108 and the containing portion 110 may be manufactured in any way that would be known by an ordinary person skilled in the art now or in the future.

The containing portion 110 includes an inner surface 116, an outer surface 118, and an insertion aperture 120. The inner surface 116 includes protrusions 124 forming one or more indents 126. In the embodiment depicted the containing portion 110 includes two end walls, two side walls and a top. The containing portion 110 may include a first half 128 and a second half 130. The containing portion 110 may include a first side 132 and a second side 134.

The containing portion 110 may be configured to contain the electrical device 106 in the interior of a tire. The insertion aperture 120 may be configured such that the electrical device 106 may be inserted through the insertion aperture 120 into a pocket formed by the patch 104 and the containing portion 110. In the embodiment depicted, the insertion aperture 120 is located on the top of the containing portion. In other embodiments the insertion aperture 120 may be located anywhere on the containing portion 110 which allows insertion of the electrical device 106 as would be known by an ordinary person skilled in the art now or in the future.

Figure 9A:
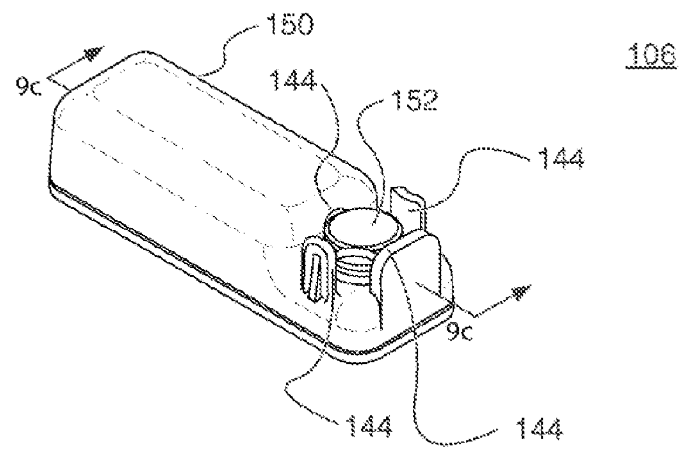
FIG. 9A depicts a perspective view of an exemplary embodiment of an electrical device.
Figure 9B:
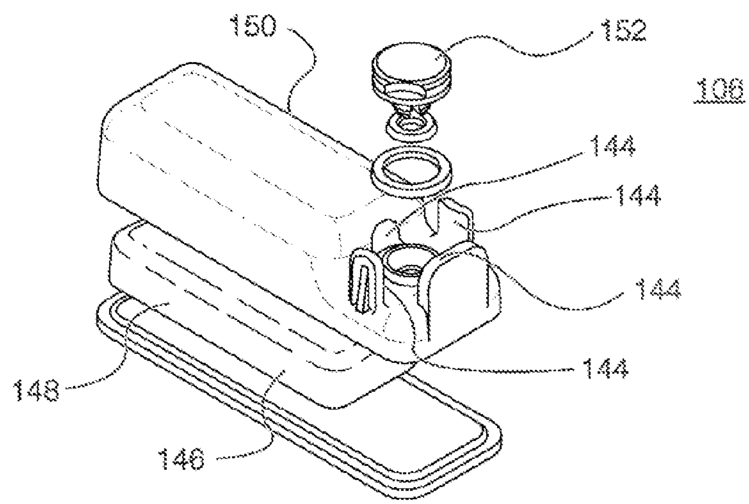
FIG. 9B depicts an expanded view of the exemplary embodiment of the electrical device in FIG. 9A.
Figure 9C:
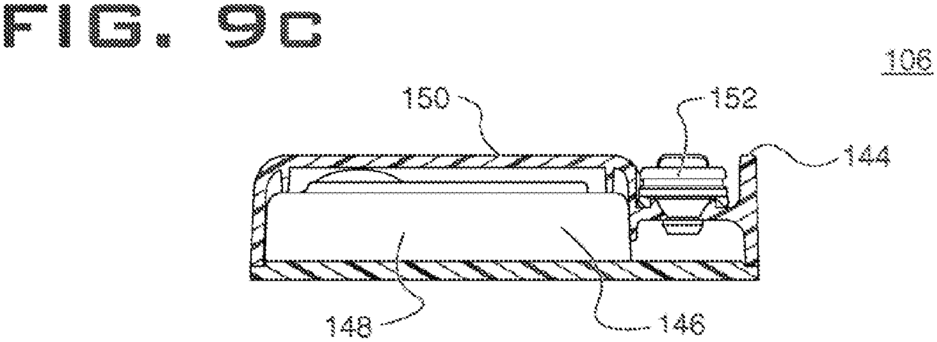
FIG. 9C depicts a cross sectional view of the exemplary embodiment of the electrical device in FIG. 9A.

The electrical device 106 may include protection protrusions 144 (shown in relation to FIGS. 9A, 9B, and 9C). The protection protrusions 144 may seat in the one or more indents 126 when the electrical device 106 is inserted in the pocket and positioned. The indents 126 may assist in securing the electrical device 106 in the pocket.

Operators, service technicians, and/or owners may insert a liquid into the interior of tires on a machine to increase tire life and/or decrease wear. The liquid may seal beads and small punctures and protect against rust. An example of such a liquid is Tire Life®.

Providing an outward flow path for any liquid flowing into the pocket formed by the containing portion 110 and the patch 106 through the insertion aperture 120 may increase the life of the electrical device 106 and increase the strength and accuracy of any signal generated by the electrical device 106. The containing portion 110 may include one or more flow apertures 122. The flow apertures 122 may be designed to create a flow of liquids through the pocket formed by the containing portion 110 and the patch 104 should liquids enter through the insertion aperture 120. The flow apertures 122 may be circular in shape or have any shape useful to create a flow of liquid through the pocket.

When a service technician inserts the electrical device 106 into the pocket he/she may insert it backwards. The containing portion 110 may have mirror image protrusion 124, indents 126 and/or flow apertures 122 such that the electrical device 106 will be contained and seated properly regardless of how it is inserted.

The mounting structure 102 may include butyl rubber, isoprene rubber, other flexible materials, or a combination of materials. Flexible coatings may also be applied to the mounting structure 102.

Figure 11:
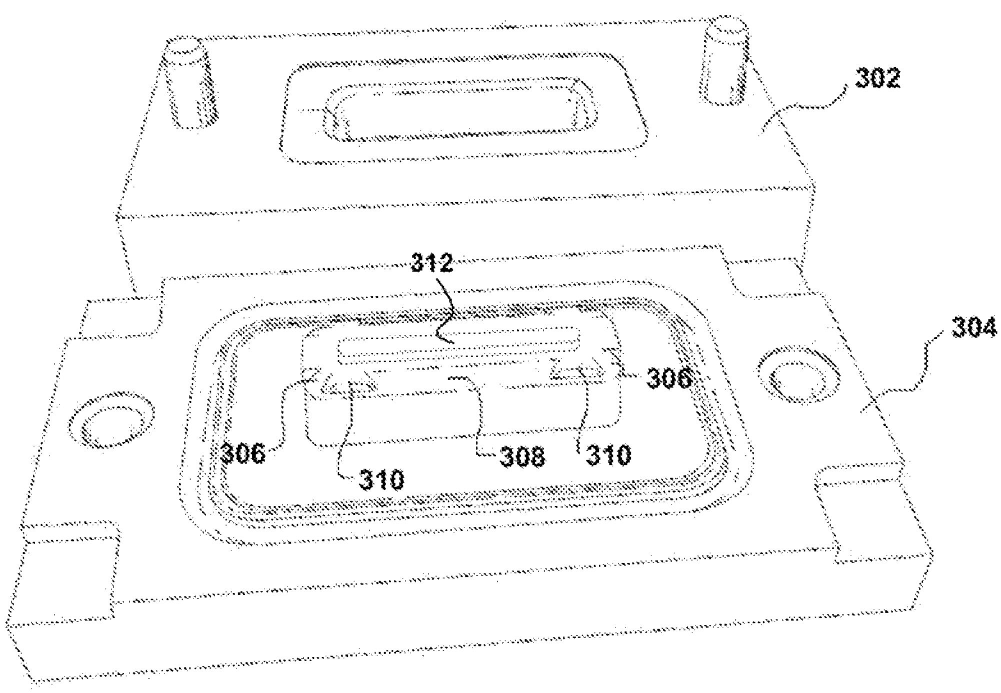
FIG. 11 depicts an exemplary mold for manufacturing a mounting structure.

Referring now to FIG. 11, the mounting structure 102 may be manufactured through a molding process using a mold 300. The mold 300 may include a first half 302 and a second half 304. The first half 302 may include end protrusion elements 306, and side protrusion elements 308 which assist in forming the protrusions 124 on the inner surface 116 of the containing portion 110. The first half 302 may include indent mold elements 310 which assist in forming the indents 126 on the inner surface 116 of the containing portion 110.

In manufacturing one embodiment of the mounting structure 102, material may be poured into the second half of the mold 304. The first half 302 may be placed on the top of the second half 304 to create a form from which the mounting structure 104 is created. In the embodiment depicted, the mold 304 includes a protrusion 312 which may form the insertion aperture 120. Other embodiments of the mold may include protrusions (not shown) which may form the flow apertures 122. In alternative embodiments, the insertion aperture 120 and/or the flow apertures 122 may not be formed in the molding process, but may be cut from the molded form. In some embodiments, the material may be placed in the mold 304 and pressure and/or heat may be used to form the mounting structure 102.

In other embodiments of the mounting structure 102, other manufacturing methods may be used as would be known by an ordinary person skilled in the art now or in the future.

Figure 7:
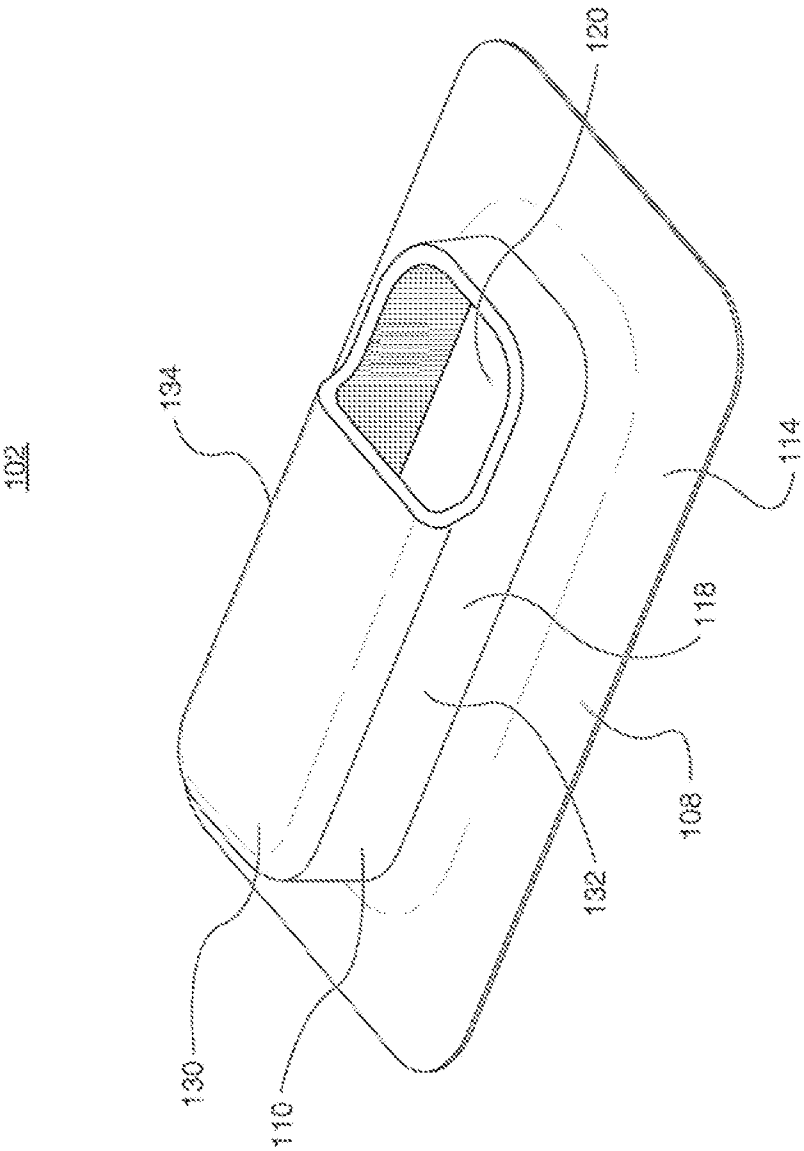
FIG. 7 depicts a perspective view of another exemplary embodiment of a mounting structure.
Figure 8:
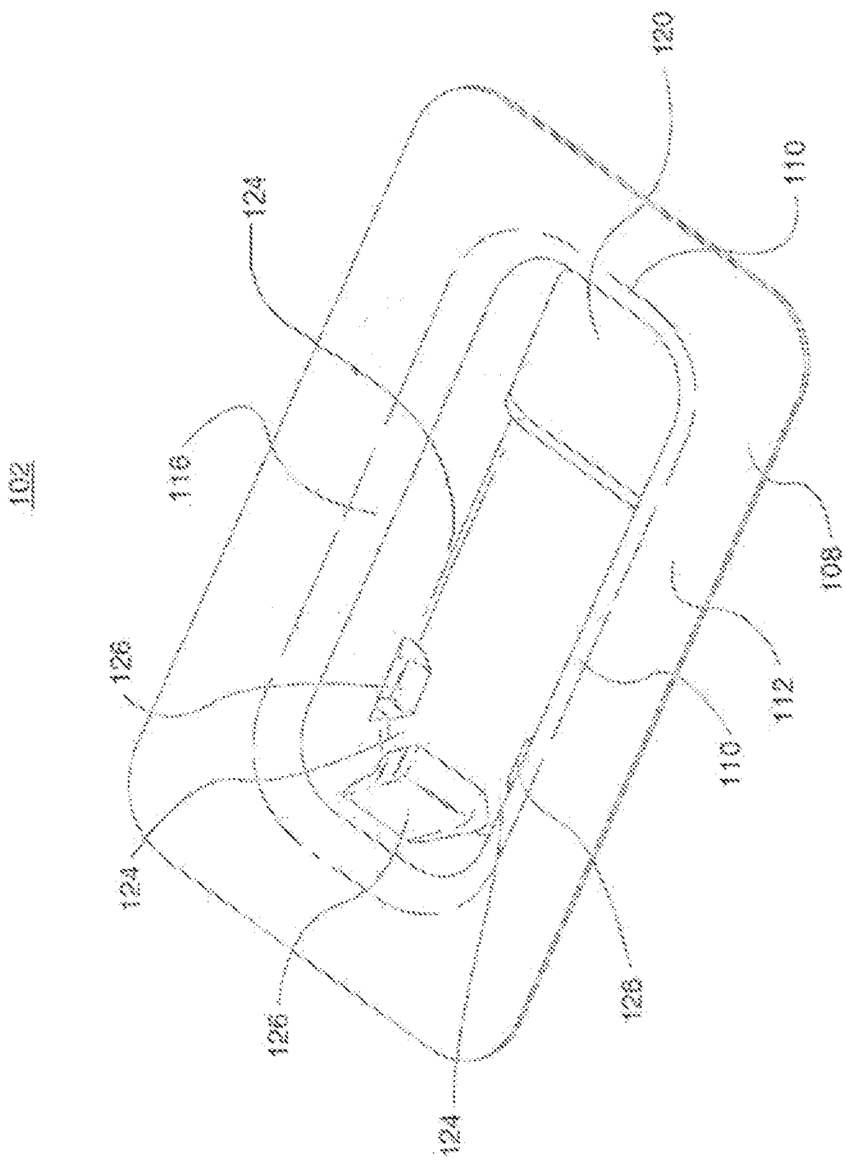
FIG. 8 depicts another perspective view of the exemplary embodiment of the mounting structure in FIG. 7.

Referring now to FIGS. 7 and 8, an alternative embodiment of the mounting structure 102 is depicted. The alternative embodiment is substantially similar to the embodiment depicted in FIGS. 5 and 6, except the insertion aperture 120 is located in the first half 128 of the containing portion 110 instead of being centered on the top of the containing portion 110. Thus the insertion aperture 120 negates the first half 128 being a mirror of the second half 130.

In an alternative embodiment, there may be insertion apertures 120 located in both the first half 128 of the containing portion 110 and the second half 130 of the containing portion 110, and the first half 128 may be a mirror of the second half 130. In another embodiment there may be insertion apertures 120 in the first half 128 and the second half 130 of the containing portion 110, but they may be of different shapes.

Returning to FIGS. 1-4, the mounting structure 102 may be fixedly attached to a patch 104. In the depicted embodiment the mounting surface 112 fixedly attaches the mounting structure 102 to the patch 104. The patch 104 may be fixedly attached to the mounting structure 102 through a cold adhesive method, a vulcanization method or any other method that would be known to an ordinary person skilled in the art now or in the future.

The patch may include rubber or other flexible material which would be known by an ordinary person skilled in the art now or in the future. For example, the patch may include non-reinforced rubber which flexes with the flexing of the sidewall of the tire. In one non-limiting example the patch may be a rubber patch such as those made by Patch Rubber Company.

The patch 104 may include an adhesive surface 136 and an outer surface 138. The patch 104 may include one or more edges 143 which may be tapered. The outer surface 138 may include a mounting area 140 and a containing area 142. The mounting structure 102 may be fixedly attached to the mounting area 140. The containing area 142 and the inner surface 116 of the containing portion 110 may form a pocket to contain the electrical device 106.

Referring now to FIGS. 9*a*, 9*b*, and 9*c*, the electrical device 106 is depicted. The electrical device 106 may be any electrical device which an ordinary person skilled in the art now or in the future might want to secure to the inside of a tire. The electrical device 106 may send a wireless signal to a receiver. In one embodiment the wireless signal may be an RF signal.

It may be desirable for an operator, owner, or other interested person to know the pressure and temperature inside a tire. Knowing this data may enable the person to better schedule service for the vehicle, reduce damage to the vehicle, and/or reduce vehicle downtime. Additional and alternative uses for this information will be known by ordinary persons skilled in the art now or in the future.

In one embodiment, the electrical device 106 may be a temperature sensor 146. In another embodiment the electrical device 106 may be a pressure sensor 148. Another embodiment of the electrical device 106 may include both a temperature sensor 146 and a pressure sensor 148. In some embodiments, the electrical device 106 may include an accelerometer, a wheel rotation counter, and/or an identification device.

The electrical device 106 may include a housing 150. The housing 150 may protect the electrical device 106 from the environment of the interior of a tire. The housing 150 may include protective protrusions 144. The protective protrusions 144 may protect elements of the electrical device 106 from damage. The protective protrusions 144 may seat in indents 126 in the mounting structure 102.

The housing 150 may include an air vent 152 for allowing air from the interior of a tire to reach the electrical device 106 without liquid being able to do the same. The protective protrusions 144 may protect the air vent 152 from damage.

INDUSTRIAL APPLICABILITY

Figure 10:
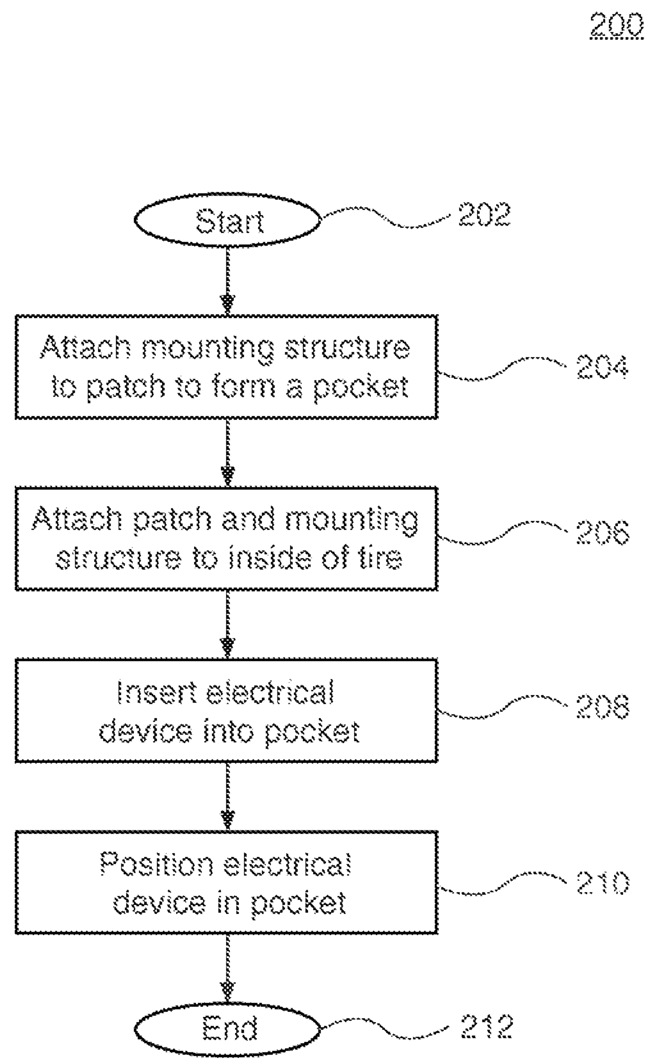
FIG. 10 depicts a flow chart of an exemplary method of mounting an electrical device to the inside of a tire.

Referring now to FIG. 10, a method 200 of mounting an electrical device 106 to the inside of a tire is depicted. The method 200 includes fixedly attaching the mounting surface 112 of the mounting structure 102 to the mounting area 140 of the patch outer surface 138 to form a pocket from the containing area 142 of the patch 104 and the inner surface 116 of the containing portion 110 of the mounting structure 102; fixedly attaching the patch adhesive surface to the inside of the mounting structure 102; inserting the electrical device 106 into the pocket through the insertion aperture 120; and positioning the electrical device 106 in the pocket such that the protection protrusion 144 on the electrical device 106 sits in the indent 126 formed by protrusions 124 on the inner surface 116 of the containing portion 110, and the electrical device 106 is in fluidic contact with the interior of the tire through the insertion aperture 120 and flow aperture 122.

The method 200 starts at 202.

At step 204 the mounting structure 102 is attached to the patch 104 to form a pocket. The mounting structure 102 may be fixedly attached to the patch by any method that is known by an ordinary person skilled in the art now or in the future. In one embodiment step 204 may include vulcanization. In another embodiment step 204 may include using a cold adhesive. Step 204 may include fixedly attaching the mounting surface 112 of the mounting portion 108 to the mounting area 140 of the patch outer surface 138. In some embodiments, the mounting structure 102 may be attached to the patch 104 during a manufacturing process, or the mounting structure 102 and the patch 104 may be integral to each other.

In step 206, the patch 104 and mounting structure 102 are attached to the inside of the tire. The attachment may be by means of adhesives such as glue. Adhesives that would attach the mounting structure 102 and patch 104 to the inside of the tire are known in the art. In one non-limiting example an adhesive that is used to attach patches to repair holes or punctures in tires may be used. In one exemplary embodiment, the patch 104 includes a low temperature cure gum. In another exemplary embodiment the patch 104 includes a high temperature cure gum. Each of these exemplary embodiments may require different adhesives as known in the art.

In step 208, the electrical device 106 is inserted in the pocket.

In step 210, the electrical device 106 is positioned in the pocket. The protective protrusions 144 of the housing 150 may be seated in indents 126. This may limit the movement of electrical device 106 in the pocket. In some embodiments the electrical device 106 is correctly position when inserted, as the mounting structure 102 only allows insertion in one way.

In some embodiments, the first half 128 is a mirror image of the second half 130. In this embodiment, if a technician inserts the electrical device 106 backwards, it will still sit correctly. In other embodiments, although some elements of the first half 128 and the second half 130 may not be mirror images, the protrusions 124 and indents 126 may be mirrored such that the electrical device 106 may sit correctly regardless of it being inserted backwards.

In step 212, the method 200 ends.

From the foregoing it will be appreciated that, although specific embodiments have been described herein for purposes of illustration, various modifications or variations may be made without deviating from the spirit or scope of inventive features claimed herein. Other embodiments will be apparent to those skilled in the art from consideration of the specification and figures and practice of the arrangements disclosed herein. It is intended that the specification and disclosed examples be considered as exemplary only, with a true inventive scope and spirit being indicated by the following claims and their equivalents.

What is claimed is:

1. A mounting structure for an electrical device, comprising:

a mounting portion having a mounting surface and an outer surface, a containing portion including a plurality of sides defining a pocket and having an inner surface with protrusions forming an indent, an outer surface, and an insertion aperture, and a flow aperture formed in at least one of the plurality of side walls of the containing portion, wherein the containing portion is configured to receive an electrical device inserted into the pocket through the insertion aperture, the insertion aperture being smaller than a cross-sectional area of the electrical device, and the electrical device being substantially the same size as the pocket.

2. The mounting structure of claim 1, wherein;

the containing portion includes a first half and a second half, the protrusions forming at least one indent on the first half and the second half, and, the at least one indent on the first half is a mirror of the at least one indent on the second half.

3. The mounting structure of claim 1, wherein;

the containing portion includes a first half and a second half, and the first half includes the insertion aperture.

4. The mounting structure of claim 1, wherein;

the containing portion includes a first half and a second half, and the insertion aperture is substantially symmetrical with respect to the first half and the second half.

5. The mounting structure of claim 1, wherein the containing portion includes a first side having a flow aperture and a second side having a flow aperture.

6. The mounting structure of claim 1, wherein;

the containing portion includes a first half having a flow aperture and a second half having a flow aperture, and the flow aperture on the first half is a mirror of the flow aperture on the second half.

7. The mounting structure of claim 1, further comprising a flexible material.

8. The mounting structure of claim 1, further comprising butyl rubber or isoprene rubber.

9. The mounting structure of claim 1, wherein the mounting structure is formed through a molding process, and cutting process to form the insertion aperture and the flow aperture.

10. The mounting structure of claim 1, wherein:

the inner surface of the containing portion defines a perimeter of the pocket, and a perimeter of the insertion aperture is at least partially within the perimeter of the pocket.

11. A mounting assembly for mounting an electrical device to the inside of a tire, comprising:

a patch including an adhesive surface, and an outer surface having a mounting area and a containing area, a mounting structure including, a mounting portion having a mounting surface fixedly attached to the mounting area, and an outer surface, and a containing portion having an inner surface with protrusions forming an indent, an outer surface, an insertion aperture, and a flow aperture in a side wall of the containing portion, and an electrical device at least partially enclosed by the containing portion and containing area, the electrical device having a protection protrusion in the indent, wherein the electrical device having the protection protrusion is insertable into the containing portion through the insertion aperture, and wherein the electrical device, when positioned in the containing portion, includes a cross-sectional area in a plane parallel to the insertion aperture that is larger than the insertion aperture.

12. The mounting assembly of claim 11, wherein the electrical device includes a temperature sensor.

13. The mounting assembly of claim 11, wherein the electrical device includes an air pressure sensor.

14. The mounting assembly of claim 11 wherein the electrical device includes a housing with an air vent substantially impervious to liquids.

15. The mounting assembly of claim 14, wherein the protection protrusion is configured to prevent damage to the air vent.

16. The mounting assembly of claim 14, wherein the electrical device is configured for wireless communication.

* * * * *